Patented Oct. 8, 1940

2,217,207

UNITED STATES PATENT OFFICE 2,217,207

FUNGICIDAL PREPARATION

William P. ter Horst, Packanack Lake, N. J., assignor to United States Rubber Company, New York, N. Y., a corporation of New Jersey No Drawing. Application June 14, 1939,
Serial No. 279,131

6 Claims. (Cl. 167—30)

This invention relates to new and useful improvements in fungicidal preparations.

The fungicides of the present invention include compounds having the formula

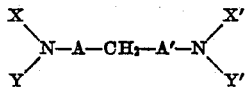

where A and A' are each an aromatic ring; X and Y are each hydrogen or an alkyl group; and X' and Y' are each hydrogen or an alkyl group. The compounds are called diamino- or alkyl substituted diamino-diaryl methanes. The fungicides may be used in the form of sprays or dusts, alone or in combination with other fungicides or with insecticides or with fertilizers, with mineral oils or vegetable oils, or with suitable auxiliary agents, such as wetting agents, sticking agents, spreading agents, and the like. They may be used to prevent or retard fungus growth wherever it occurs, such as for medicinal purposes, on and in plants, seed, textiles, paints, leather, fur, glue, etc.

Tests demonstrating the effectiveness of the materials in preventing spore germination were carried out as follows:

An aqueous solution or suspension of the chemical to be tested containing 5 grams thereof per liter of water was prepared. This solution or suspension was sprayed on glass slides which had previously been coated with nitrocellulose. An atomizer was used capable of delivering 10 cc. spray liquid in 36 seconds. A glass slide was positioned two feet away from the nozzle of the atomizer. Spraying was carried out for, respectively, 3 seconds, 5½ seconds, 8 seconds, 10½ seconds and 13 seconds. The spray deposit was allowed to dry. The test organism, for example *Macrosporium sarcinaeforme* was then inoculated on the sprayed slide and germination was allowed to take place in a moist chamber at 25° C. On the untreated slides usually approximately 98% of the spores germinated. Results with two of the new chemicals were as follows:

| Chemical | Percent spore germination | | | | |
|---|---|---|---|---|---|
| | 3″ | 5½″ | 8″ | 10½″ | 13″ |
| p,p'-diamino-diphenyl methane | 96.0 | 82.3 | 54.7 | 31.0 | 8.0 |
| Tetramethyl - p,p' - diamino - dipnenyl methane | 0 | 0 | 0 | 0 | 0 |

The effectiveness of the chemicals as seed protectants is illustrated by the following experiments:

Pea seed of the variety "Wilt Resistant Perfection" was dusted with .25% by weight of the seed protectant by tumbling the same and the seed in a container until mixing has been accomplished. The seed was then put in a soil artificially inoculated with Rhizoctania Solani. The following observations were made:

| | Percent germination after 6 days | Percent healthy sprouts |
|---|---|---|
| Untreated seed | 87 | 4 |
| Seed treated with .25% p,p'-diamino diphenylmethane | 97 | 87 |

Instead of the compounds referred to above, related compounds may be used such as p,p-di-amino-ditolyl-methane, di-methyl - diamino-di-phenyl-methane, tetra-ethyl-diamino-diphenyl-methane and the corresponding higher alkyl compounds (propyl, iso-propyl, butyl, amyl, etc.), tetra-methyl-diamino-ditolyl-methane and the corresponding compounds thereto wherein the alkyl groups are ethyl, propyl, iso-propyl, butyl, amyl, etc.

The chemicals described herein may be applied undiluted or suspended in water or other vehicles or mixed with talc, clay, and the like.

Having thus described my invention, what I claim and desire to protect by Letters Patent is:

1. A fungicidal preparation containing as an active constituent a diamino-diaryl methane of the benzene series.

2. A fungicide preparation containing as an active constituent a compound having the structure.

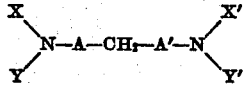

where A and A' are each an aromatic ring of the benzene series; X and Y are each hydrogen or an alkyl group; and X' and Y' are each hydrogen or an alkyl group.

3. A fungicidal preparation containing as an active constituent an N,N'-dialkyl-diamino-diaryl methane of the benzene series.

4. A fungicidal preparation containing as an active constituent an N,N'-tetra-alkyl-diamino-diaryl methane of the benzene series.

5. A fungicidal preparation containing as an active constituent an N,N'-tetra-methyl-diamino-diaryl methane of the benzene series.

6. A fungicidal preparation containing as an active constituent N,N'-tetra-methyl-p,p'-diamino-diphenyl methane.

WILLIAM P. ter HORST.